United States Patent
Safai et al.

(10) Patent No.: US 10,780,658 B2
(45) Date of Patent: Sep. 22, 2020

(54) HEATING SYSTEM FOR COMPOSITE REWORK OF AIRCRAFT

(71) Applicant: The Boeing Company, Chicago, IL (US)

(72) Inventors: Morteza Safai, Seattle, WA (US); Kimberly D. Meredith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 25 days.

(21) Appl. No.: 16/113,879

(22) Filed: Aug. 27, 2018

(65) Prior Publication Data

US 2019/0001594 A1    Jan. 3, 2019

Related U.S. Application Data

(62) Division of application No. 13/207,738, filed on Aug. 11, 2011, now Pat. No. 10,137,651.

(51) Int. Cl.
| | |
|---|---|
| *B29C 73/10* | (2006.01) |
| *B23K 26/00* | (2014.01) |
| *B23K 26/082* | (2014.01) |
| *B29C 73/34* | (2006.01) |
| *B23K 26/03* | (2006.01) |
| *B23K 26/352* | (2014.01) |
| *B29C 35/08* | (2006.01) |
| *B23K 101/34* | (2006.01) |

(Continued)

(52) U.S. Cl.
CPC .......... *B29C 73/10* (2013.01); *B23K 26/0006* (2013.01); *B23K 26/032* (2013.01); *B23K 26/082* (2015.10); *B23K 26/352* (2015.10); *B29C 73/34* (2013.01); *B23K 2101/34* (2018.08); *B23K 2103/16* (2018.08); *B23K 2103/38* (2018.08); *B23K 2103/42* (2018.08); *B29C 2035/0838* (2013.01)

(58) Field of Classification Search
CPC ....... B29C 73/10; B29C 26/082; B29C 73/34; B23K 26/352; B23K 26/0006; B23K 26/032
USPC ......................................................... 156/64
See application file for complete search history.

(56) References Cited

U.S. PATENT DOCUMENTS

| 4,009,364 A | 2/1977 | Ladstadter |
| 4,743,733 A | 5/1988 | Mehta et al. |

(Continued)

FOREIGN PATENT DOCUMENTS

| DE | 3903153 A1 | 8/1990 |
| DE | 19817629 A1 | 10/1999 |

(Continued)

OTHER PUBLICATIONS

DE 19817629, English abstract (Year: 1990).*

(Continued)

*Primary Examiner* — Michael N Orlando
*Assistant Examiner* — Elizabeth Bradford
(74) *Attorney, Agent, or Firm* — Yee & Associates, P.C.

(57) ABSTRACT

A method and apparatus comprising a laser unit and a controller. The laser unit is configured to generate a number of laser beams. The controller is configured to operate the laser unit to generate the number of laser beams resulting in a desired level of heating of a composite patch that cures the composite patch on a composite structure.

20 Claims, 12 Drawing Sheets

(51) Int. Cl.
　　　*B23K 103/16*　　　(2006.01)
　　　*B23K 103/00*　　　(2006.01)

(56) References Cited

U.S. PATENT DOCUMENTS

| | | |
|---|---|---|
| 4,874,948 A | 10/1989 | Cielo et al. |
| 4,944,817 A | 7/1990 | Bourell et al. |
| 5,078,821 A | 1/1992 | Garvey et al. |
| 5,519,486 A | 5/1996 | Baird et al. |
| 5,811,055 A | 9/1998 | Geiger |
| 5,968,382 A | 10/1999 | Matsumoto et al. |
| 6,010,746 A | 1/2000 | Descoteaux et al. |
| 6,129,489 A | 10/2000 | Linderholm |
| 6,144,010 A | 11/2000 | Tsunemi et al. |
| 6,149,749 A | 11/2000 | McBroom |
| 6,174,392 B1 | 1/2001 | Reis |
| 6,384,370 B1 | 5/2002 | Tsunemi et al. |
| 7,424,902 B2 | 9/2008 | Engelbart et al. |
| 7,509,735 B2 | 3/2009 | Philip et al. |
| 7,664,153 B2 | 2/2010 | Inenaga |
| 7,682,970 B2 | 3/2010 | Grigoropoulos et al. |
| 8,396,187 B2 | 3/2013 | Safai |
| 2005/0086916 A1 | 4/2005 | Caron |
| 2005/0235493 A1 | 10/2005 | Philip et al. |
| 2006/0044555 A1 | 3/2006 | Wang et al. |
| 2006/0048881 A1 | 3/2006 | Evans et al. |
| 2006/0073309 A1 | 4/2006 | Hogg |
| 2007/0096352 A1 | 5/2007 | Cochran et al. |
| 2010/0035375 A1 | 2/2010 | Grigoropoulos et al. |
| 2010/0112190 A1 | 5/2010 | Drewett et al. |
| 2010/0243152 A1 | 9/2010 | Helfrich et al. |
| 2011/0247751 A1 | 10/2011 | Steyer et al. |
| 2012/0148026 A1 | 6/2012 | Safai |
| 2013/0037198 A1 | 2/2013 | Safai et al. |

FOREIGN PATENT DOCUMENTS

| | | |
|---|---|---|
| EP | 1535693 A1 | 6/2005 |
| JP | 2003161797 | 6/2003 |

OTHER PUBLICATIONS

DE 19817629, English machine translation (Year: 1990).*
Brecher et al., "Laser-assisted thermoplastic tape laying", Lorenz Kunststofftechnik GmbH SMC & BMC Composite News, JEC Composites, retrieved Jun. 23, 2011, pp. 1-5. http://wwwjeccomposites.com.
Zeng et al., "Laser Assisted Polymer Bonding Technology for Advanced MEMS Packaging", 2nd Electronics Systemintegration Technology Conference, Greenwich, UK, Sep. 1, 2008, pp. 1225-1230.
EP search report dated Oct. 1, 2013 regarding application 12179730.2-1703/2556915, reference P55080EP/RGH, applicant The Boeing Company, 8 pages.
Office Action, dated Oct. 4, 2012, regarding U.S. Appl. No. 13/207,738, 22 pages.
Final Office Action, dated Aug. 1, 2013, regarding U.S. Appl. No. 13/207,738, 14 pages.
Office Action, dated Jul. 2, 2014, regarding U.S. Appl. No. 13/207,738, 19 pages.
Final Office Action, dated Mar. 5, 2015, regarding U.S. Appl. No. 13/207,738, 15 pages.
Office Action, dated Jun. 10, 2016, regarding U.S. Appl. No. 13/207,738, 17 pages.
Final Office Action, dated Dec. 2, 2016, regarding U.S. Appl. No. 13/207,738, 17 pages.
Office Action, dated Feb. 7, 2018, regarding U.S. Appl. No. 13/207,738, 16 pages.
Office Action, dated Jan. 25, 2018, regarding U.S. Appl. No. 14/736,148, 18 pages.
Notice of Allowance, dated Jun. 29, 2018, regarding U.S. Appl. No. 13/207,738, 13 pages.
Notice of Allowance, dated Aug. 13, 2018, regarding U.S. Appl. No. 14/736,148, 12 pages.

\* cited by examiner

FIG. 7
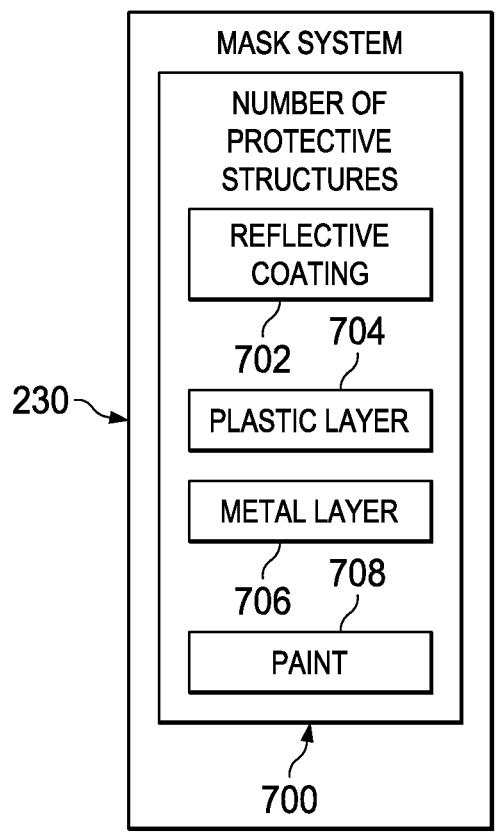
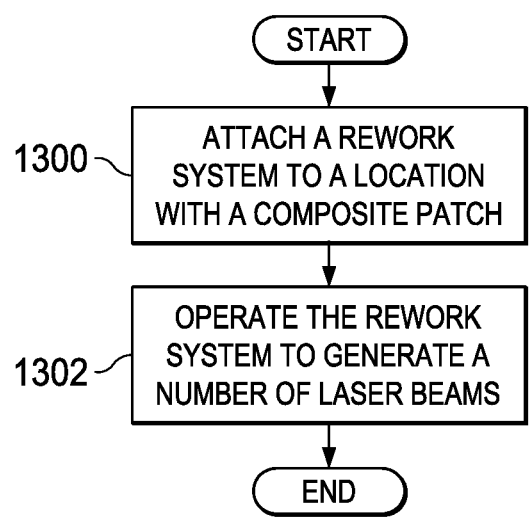
FIG. 13

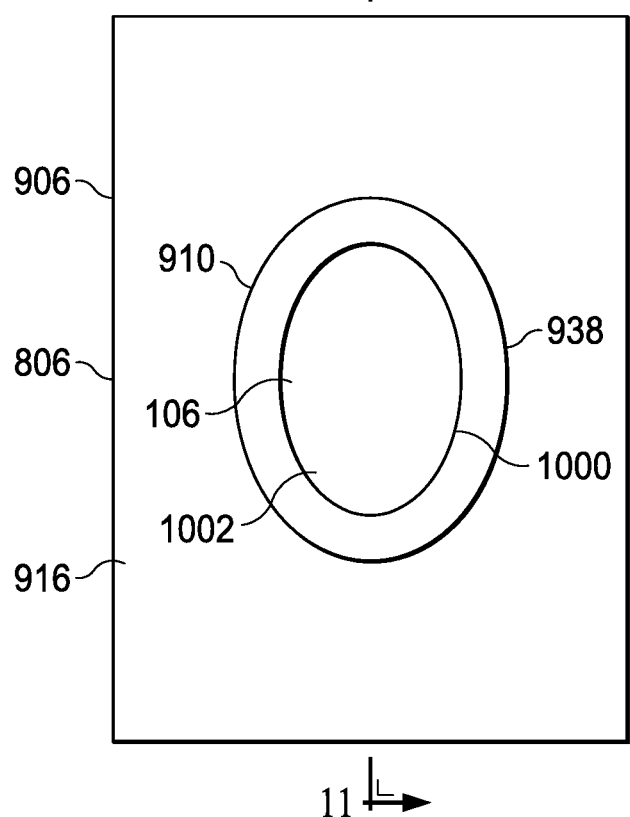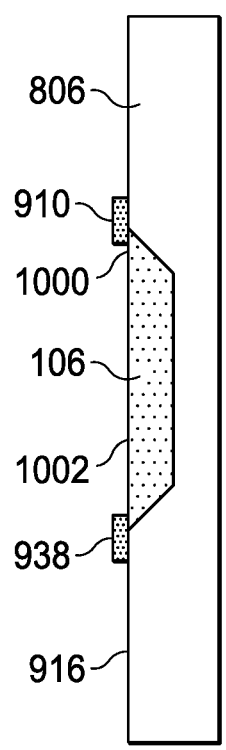

HEATING SYSTEM FOR COMPOSITE REWORK OF AIRCRAFT

This application is a divisional of application Ser. No. 13/207,738, filed Aug. 11, 2011, and issued as U.S. Pat. No. 10,137,651 on Nov. 27, 2018, the entire disclosure of which is incorporated by reference herein. Application No. 13/207,738 is also the parent of application Ser. No. 14/736,148, filed Jun. 10, 2015, and issued as U.S. Pat. No. 10,160,163 on Dec. 25, 2018.

BACKGROUND INFORMATION

1. Field

The present disclosure relates generally to aircraft and, in particular, to composite structures in aircraft. Still more particularly, the present disclosure relates to reworking composite structures in an aircraft.

2. Background

Aircraft are being designed and manufactured with greater and greater percentages of composite materials. Some aircraft may have more than 50 percent of their primary structure made from composite materials. Composite materials may reduce the weight of an aircraft. With the decreased weight, improved payload capacities and fuel efficiencies may occur. Further, composite materials may provide longer life for various components in the aircraft.

Composite materials are tough, lightweight materials and may include fibers and resins. The fibers and resins may be combined to form a cured composite material.

With composite materials, inconsistencies may occur during manufacturing or use of an aircraft. These inconsistencies may require rework. For example, a composite structure in the form of a skin panel may require rework. If an undesired inconsistency is present in the skin panel, a portion of the composite material containing the inconsistency may be removed from an area of the skin panel. The removal of the composite material involves removing layers of composite material from the skin panel where the undesired inconsistency is located. The removal of the layers removes the inconsistency.

After the layers of composite material are removed, a patch may be placed into the area. The patch is then cured to rework the skin panel. The patch often is comprised of layers of composite material similar to the layers in the area in which the composite material was removed from the skin panel.

In curing the patch, heat and vacuum are often applied to the patch. Currently, heating of the patch may involve using a heat blanket. The heat blanket is placed over the patch. Additionally, pressure may be applied by placing a bag over the heat blanket and applying a vacuum to the bag.

Challenges are present with heating composite structures. Uniform heating of the patch is desirable in curing these types of structures. The uniform heating may provide for a desired curing in the patch resulting in a desired level of performance for the patch. Current heating systems using heat blankets may not provide as uniform of a level of heating as desired.

Therefore, it would be advantageous to have a method and apparatus that takes into account at least some of the issues discussed above, as well as possibly other issues.

SUMMARY

In one advantageous embodiment, an apparatus comprises a laser unit and a controller. The laser unit is configured to generate a number of laser beams. The controller is configured to operate the laser unit to generate the number of laser beams resulting in a desired level of heating of a composite patch that cures the composite patch on a composite structure.

In another advantageous embodiment, a rework system for curing a composite patch in a location comprises a frame, a laser unit, a sensor system, and a controller. The frame is configured to be attached to the location. The laser unit is associated with the frame. The laser unit is configured to generate a laser beam. The sensor system is configured to generate temperature data about the composite patch. The controller is configured to operate the laser unit to generate the laser beam resulting in a desired level of heating of the composite patch that cures the composite patch on a composite structure.

In yet another advantageous embodiment, a method for curing a composite patch on a composite structure is provided. A rework system is attached to a location with the composite patch. The rework system comprises a laser unit configured to generate a number of laser beams and a controller configured to operate the laser unit. The rework system is operated to generate the number of laser beams resulting in a desired level of heating of a composite patch that cures the composite patch on the composite structure.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 7 is an illustration of a block diagram of a mask system in accordance with an advantageous embodiment;

FIG. 10 is an illustration of a patch in a rework area with a mask system in accordance with an advantageous embodiment;

FIG. 11 is an illustration of a cross-sectional view of a rework area in accordance with an advantageous embodiment;

FIG. 13 is an illustration of a flowchart of a process for curing a composite patch in accordance with an advantageous embodiment;

DETAILED DESCRIPTION

The different advantageous embodiments recognize and take into account one or more different considerations. For example, the different advantageous embodiments recognize and take into account that in addition to heat, a vacuum may be applied in an area in which a composite patch is applied for rework. The vacuum is applied to a bag covering the heat blanket. The bag with the vacuum applies pressure on the blanket to provide a more-uniform level of heating.

The different advantageous embodiments recognize and take into account that the configuration of the surface of the structure being reworked may not allow for uniform contact by a heat blanket. As a result, the heating of the composite patch may not be as uniform as desired.

For example, a heat blanket may provide more-uniform contact and more-uniform heating of a composite patch when the surface is substantially planar or has a curve rather than an angle.

When the surface is not substantially planar, the heating provided by the heat blanket may not be as uniform as desired. For example, windows, doorways, wing attachments, and other similar locations may be ones that have surfaces that are more difficult to apply uniform heating with heat blankets.

The different advantageous embodiments also recognize and take into account that even if uniform heating can be accomplished using current techniques, the current techniques may not be able to reduce heating of areas around the patch in a desirable fashion. For example, areas around the patch may include coatings, systems, or other components for which temperatures used to cure the patch may be undesirable. The temperatures achieved in curing a patch may result in a decreased performance or a need to rework those areas.

Thus, the different advantageous embodiments provide a method and apparatus for heating a composite material. In one advantageous embodiment, an apparatus comprises a laser unit and a controller. The laser unit is configured to generate a number of laser beams. The controller is configured to operate the laser unit to generate the number of laser beams resulting in a desired level of heating of a composite patch that cures the composite patch on the composite structure.

Figure 1:
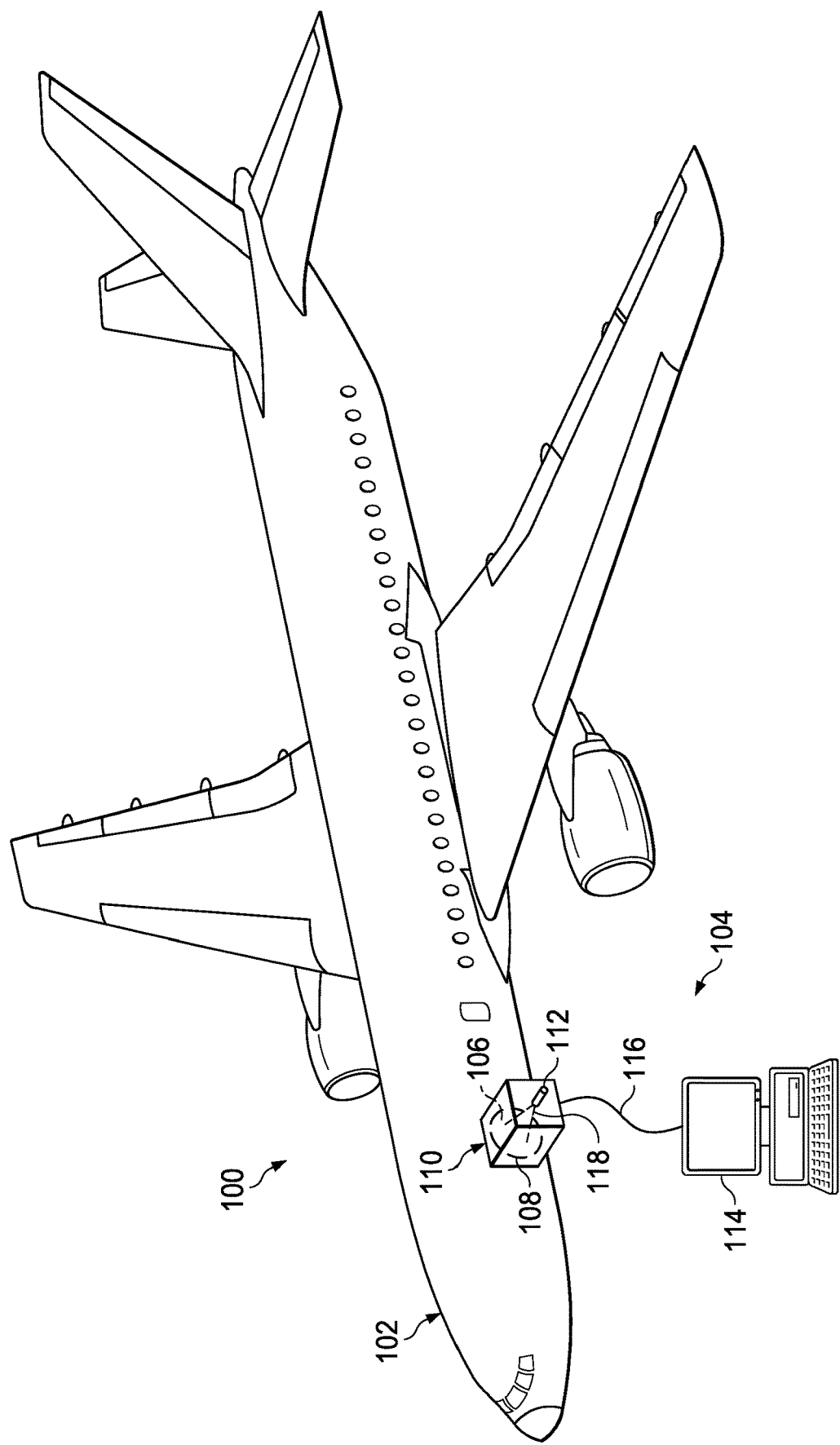
FIG. 1 is an illustration of a rework environment in accordance with an advantageous embodiment.

With reference now to FIG. 1, an illustration of a rework environment is depicted in accordance with an advantageous embodiment. In this illustrative example, rework environment 100 includes aircraft 102 and rework system 104. Rework system 104 is used to generate heat in composite patch 106 in location 108 on aircraft 102. The heat cures composite patch 106. In this illustrative example, composite patch 106 is shown in phantom.

Rework system 104 comprises frame 110, laser unit 112, and computer 114. Frame 110 covers composite patch 106 in this illustrative example. Frame 110 is configured to be connected to aircraft 102. In these illustrative examples, frame 110 is removably connected to aircraft 102 for purposes of performing rework at location 108.

Laser unit 112 is associated with frame 110. The association is a physical association in these depicted examples. A first component, such as laser unit 112, may be considered to be associated with a second component, such as frame 110, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Computer 114 is connected to laser unit 112 through communications link 116. Communications link 116 takes the form of a cable in this illustrative example. Computer 114 is configured to send commands to laser unit 112 through communications link 116.

In this illustrative example, computer 114 controls the operation of laser unit 112 in these illustrative examples. Computer 114 controls laser unit 112 to generate laser beam 118.

In these illustrative examples, location 108 is a location of a composite structure in which rework of aircraft 102 is performed. In response to commands from computer 114, laser unit 112 moves laser beam 118 over composite patch 106.

The movement of laser beam 118 over composite patch 106 heats composite patch 106 to cure composite patch 106 in location 108. In these illustrative examples, laser beam 118 is generated by laser unit 112 in a manner that causes a desired level of heating in composite patch 106 to cure composite patch 106. The desired level of heating is configured to obtain a desired level of performance of composite patch 106 in location 108.

Figure 2:
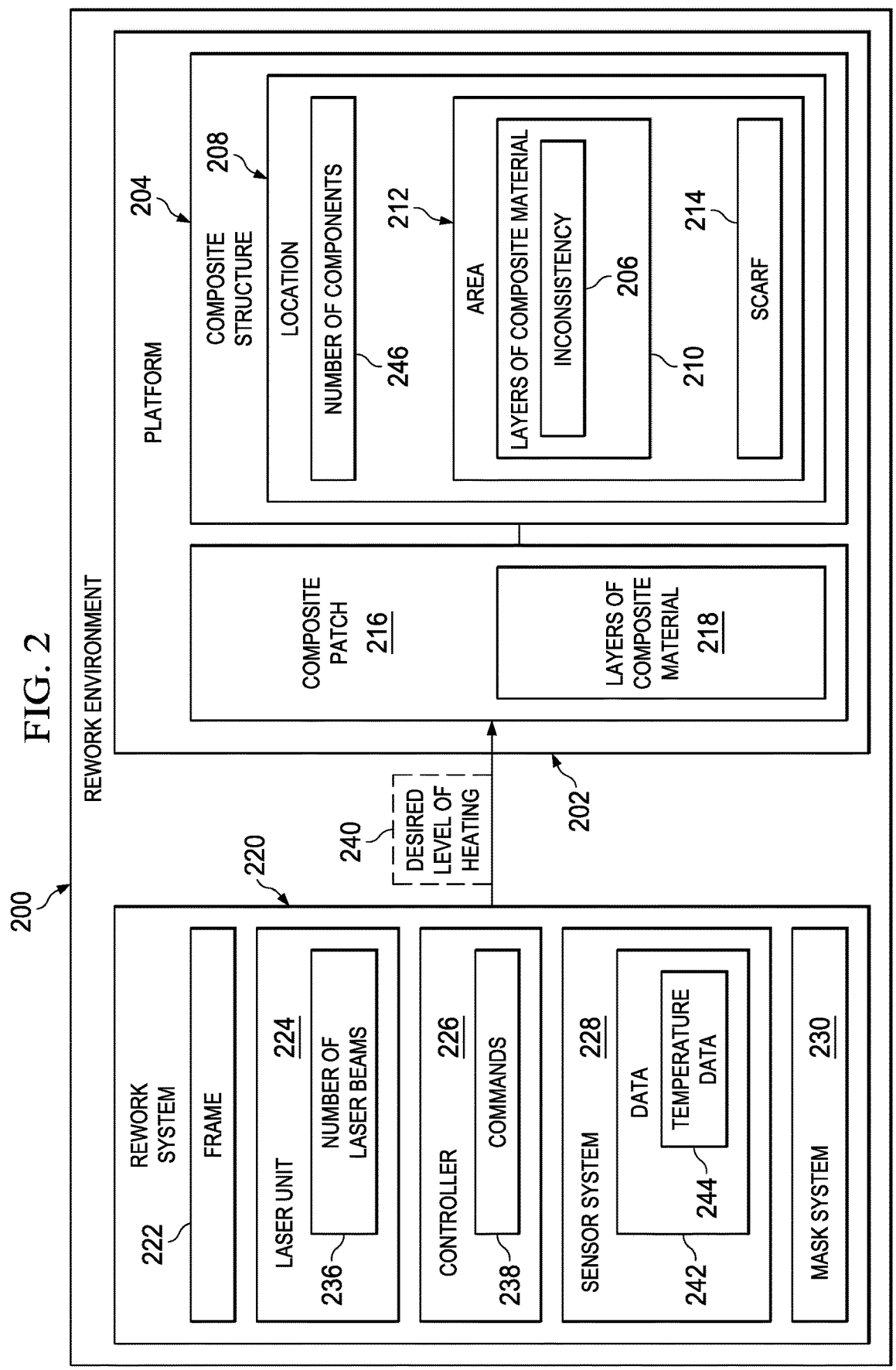
FIG. 2 is an illustration of a block diagram of a rework environment in accordance with an advantageous embodiment.

With reference now to FIG. 2, an illustration of a block diagram of a rework environment is depicted in accordance with an advantageous embodiment. Rework environment 100 in FIG. 1 is an example of one implementation for rework environment 200 in FIG. 2.

As illustrated, rework may be performed on composite structure 204 for platform 202. Rework may be performed when inconsistency 206 is present. As illustrated, inconsistency 206 is present in location 208 of composite structure 204 on platform 202.

In performing rework, layers of composite material 210 are removed from area 212 at location 208. In this depicted example, layers of composite material 210 include inconsistency 206. As a result, removing layers of composite material 210 also removes inconsistency 206.

The removal of layers of composite material 210 forms scarf 214 in area 212 at location 208. Scarf 214 is a volume which results from removing layers of composite material 210 in area 212.

Thereafter, composite patch 216 is placed into scarf 214 in area 212. Composite path 216 may comprise layers of composite material 218 in an uncured form. Composite patch 216 may be a prepreg patch. As depicted, a prepreg patch is comprised of layers of fabric and resin infused into the layers of fabric in an uncured form. After composite patch 216 has been placed into scarf 214, rework system 220 cures composite patch 216.

In these illustrative examples, rework system 220 is configured to cure composite patch 216. As depicted, rework system 220 comprises frame 222, laser unit 224, controller 226, sensor system 228, and mask system 230.

Frame 222 may be hardware that is configured to be attached to platform 202 at location 208. Frame 222 provides a structure to which laser unit 224 may be associated. All or a portion of laser unit 224 may be supported by frame 222.

In the depicted example, laser unit 224 is hardware that is configured to generate number of laser beams 236. As used herein, "a number", when used with reference to items, means one or more items. For example, "number of laser beams 236" is one or more of number laser beams 236.

In these illustrative examples, controller 226 is hardware and controls the operation of laser unit 224. Controller 226 also may include software. Controller 226 generates commands 238. Commands 238 are received by laser unit 224 from controller 226 and cause laser unit 224 to generate number of laser beams 236. Number of laser beams 236 is generated in a manner resulting in desired level of heating 240 of composite patch 216.

This desired heating may occur in a manner that cures composite patch 216 in scarf 214 in area 212 at location 208. Desired level of heating 240 may be such that composite patch 216 when cured performs in a desired manner with composite structure 204. Desired level of heating 240 may be identified in a number of different ways. For example, desired level of heating 240 may be a particular temperature, a range of temperatures, an amount of resin flow, and/or other suitable types of parameters.

Sensor system 228 is hardware and is configured to generate data 242. Data 242 is data about area 212 in which the rework is performed in these illustrative examples. For example, without limitation, sensor system 228 is configured to detect the heating of composite patch 216. Sensor system 228 generates temperature data 244. For example, temperature data 244 may take the form of images, temperature values, and other suitable types of data, indicating the temperature and/or curing of composite patch 216.

Temperature data 244 is sent to controller 226 and may be used by controller 226 to obtain desired level of heating 240 for composite patch 216. The use of sensor system 228 with laser unit 224 and controller 226 provides a feedback system.

Mask system 230 is hardware that may cover number of components 246 in area 212. Number of components 246 may be one or more components for which heating may be undesirable. Mask system 230 is configured to reduce heating of number of components 246 by number of laser beams 236.

The illustration of rework environment 200 in FIG. 2 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some configurations, rework system 220 may not include sensor system 228. In still other illustrative examples, controller 226 may be integrated as part of laser unit 224 rather than a separate component.

Figure 3:
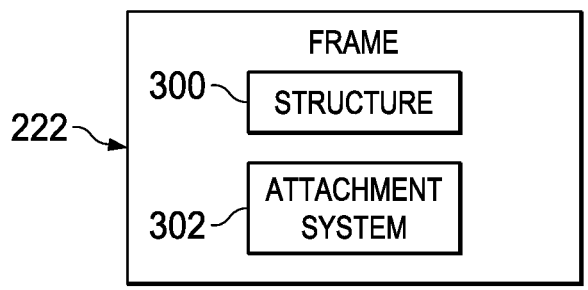
FIG. 3 is an illustration of a block diagram of a frame in accordance with an advantageous embodiment.

Turning next to FIG. 3, an illustration of a block diagram of a frame is depicted in accordance with an advantageous embodiment. In this illustrative example, frame 222 comprises structure 300 and attachment system 302. Structure 300 is the structure in frame 222 that is associated with laser unit 224 in FIG. 2. All or a portion of laser unit 224 may be connected to structure 300.

Structure 300 may take a number of different forms. For example, structure 300 may be a wire frame structure, a housing with opaque walls, and other suitable forms. When structure 300 takes the form of a housing, the housing may be a hood. The hood may reduce and/or prevent an operator from being exposed to a laser beam emitted from within the hood.

Attachment system 302 is the portion of frame 222 that is configured to attach frame 222 to platform 202 in FIG. 2. In this illustrative example, attachment system 302 may take a number of different forms. For example, without limitation, attachment system 302 may be comprised of at least one of a vacuum system, suction cups, adhesive, a fastener system, and other suitable types of components or devices that may connect frame 222 to platform 202.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

Figure 4:
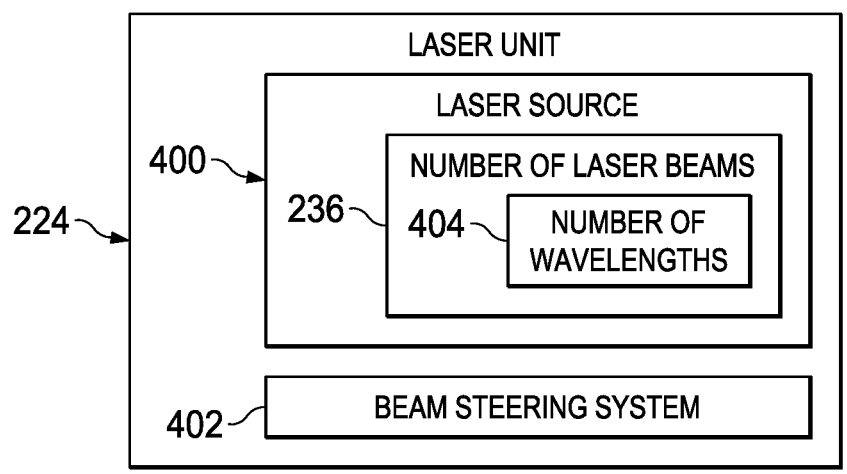
FIG. 4 is an illustration of a block diagram of a laser unit in accordance with advantageous embodiment.

With reference next to FIG. 4, an illustration of a block diagram of a laser unit is depicted in accordance with advantageous embodiment. As depicted, laser unit 224 comprises laser source 400 and beam steering system 402.

Laser source 400 may be any device configured to emit light through a process of optical amplification. Laser source 400 generates number of laser beams 236 in these illustrative examples. Number of laser beams 326 has number of wavelengths 404. The range of wavelengths 404 may be, for example, from about 1300 nanometers to about 300 nanometers. Of course other ranges or wavelengths may be used depending on the implementation.

In these illustrative examples, laser source 400 may take a number of different forms. For example, laser source 400 may be a gas laser, a chemical laser, an excimer laser, a light-emitting diode laser, a solid state laser, a fiber laser, a semiconductor laser, and other suitable types of sources for generating number of laser beams 236.

Beam steering system 402 is hardware configured to steer number of laser beams 236 in a desired direction. Beam steering system 402 may comprise components including at least one of mirrors, fiber-optic cables, lenses, and other suitable types of components that may be used to direct number of laser beams 236.

Figure 5:
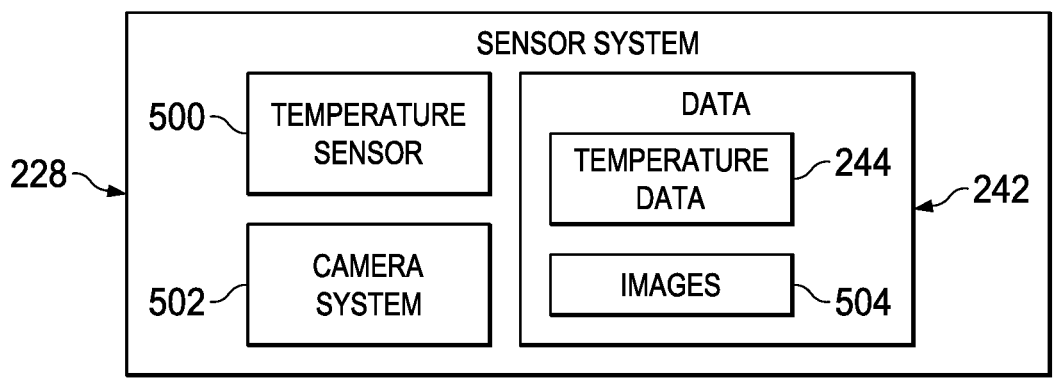
FIG. 5 is an illustration of a block diagram of a sensor system in accordance with an advantageous embodiment.

Turning now to FIG. 5, an illustration of a block diagram of a sensor system is depicted in accordance with an advantageous embodiment. In this illustrative example, sensor system 228 may be associated with frame 222 in FIG. 2. Sensor system 228 generates data 242 and comprises at least one of temperature sensor 500 and camera system 502.

Temperature sensor 500 may be selected from at least one of an infrared sensor, a non-contact thermometer, and other suitable types of sensors capable of generating temperature data 244 in data 242.

Camera system 502 also is configured to generate images 504. These images may be used as temperature data 244. In addition, images 504 may be used as types of data in data 242 other than temperature data 244.

For example, images 504 may be used to identify an area to which the laser beam is to be directed, the location of the laser beam, the amount of curing that has occurred, and/or other parameters regarding the rework being performed.

Figure 6:
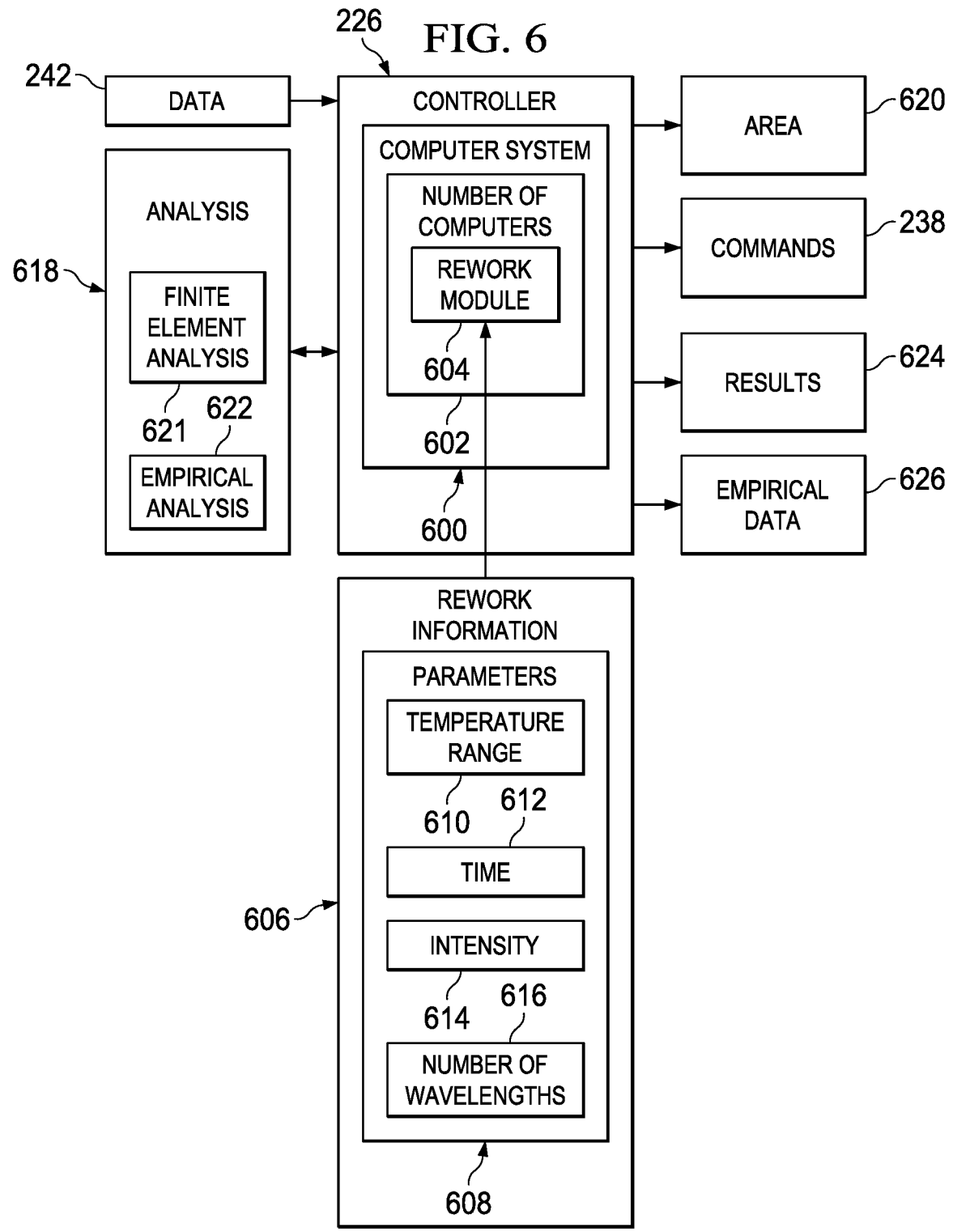
FIG. 6 is an illustration of a block diagram of a controller in accordance with an advantageous embodiment.

With reference now to FIG. 6, an illustration of a block diagram of a controller is depicted in accordance with an advantageous embodiment. In this illustrative example, controller 226 may comprise computer system 600. Computer system 600 may be formed from number of computers 602. When more than one computer is present in number of computers 602, those computers may be in communication with each other. This communication may be facilitated through a communication medium, such as, for example, a network.

In these illustrative examples, rework module 604 is located in computer system 600. Rework module 604 may be hardware, software, or a combination of the two.

Rework module 604 uses rework information 606 to generate commands 238 to operate laser unit 224 to cure composite patch 216 in FIG. 2. Rework module 604 receives rework information 606. Rework information 606 includes information about composite patch 216. Rework information 606 may take different forms. For example, rework information 606 may be stored in at least one of a database, a look-up table, a flat file, a configuration file, a program, and some other suitable form.

In these illustrative examples, rework information 606 may include parameters 608. Parameters 608 are used to generate commands 238 to operate laser unit 224 to generate number of laser beams 236 for curing composite patch 216 in FIG. 2. As depicted, parameters 608 include at least one of temperature range 610, time 612, intensity 614, number of wavelengths 616, and other suitable parameters.

Temperature range 610 indicates temperatures needed for desired level of heating 240 in FIG. 2. Intensity 614 defines an intensity for the laser beam for the particular patch. Number of wavelengths 616 identifies one or more wavelengths for the laser beam. In these illustrative examples, number of wavelengths 616 is selected to increase the absorption of light in the laser beam by the composite patch.

The one or more wavelengths may be selected such that temperature range 610 may be reached more easily, as compared to other wavelengths. In this manner, desired level of heating 240 may occur in the patch but not in other areas that may have different types of materials.

When sensor system 228 is present in rework system 220, controller 226 may receive data 242 from sensor system 228 in FIG. 2. Data 242 may be used to identify area 620. Area 620 is an area in which number of laser beams 236 should be directed to cure composite patch 216. Area 620 may be the same as area 212 in FIG. 2.

For example, images 504 in data 242 in FIG. 5 may be used to identify a boundary for composite patch 106 in FIG. 1. This boundary is used to identify area 620 in which number of laser beams 236 should be directed. In this manner, rework module 604 uses area 620 and rework information 606 to generate commands 238. Commands 238 are sent to laser unit 224 to perform the curing of composite patch 216.

Further, rework module 604 may receive data 242 while laser unit 224 is operating and generating number of laser beams 236. For example, rework module 604 may use images 504 in data 242 to determine whether number of laser beams 236 is within area 620. These images may be compared to the desired dimension for area 620, and the comparison may be used to direct the laser beam. Thus, with receiving images 504 during the curing of composite patch 216, rework module 604 may determine whether number of laser beams 236 is within the desired area to cure the composite patch.

Rework information 606 may be identified in a number of different ways. For example, rework information 606 may be identified using models of composite patch 216. Analysis 618 may be performed to identify heating within composite patch 216.

Analysis 618 may take different forms. For example, analysis 618 may be performed using a simulation, such as one provided through finite element analysis 621, empirical analysis 622, or some other simulation or modeling process.

When finite element analysis 621 is performed, results 624 are generated. Results 624 may be used to select values for parameters 608 that result in desired level of heating 240 of composite patch 216.

When empirical analysis 622 is performed, different permutations of parameters 608 may be tested using composite patch 216. The results of these tests are empirical data 626. Empirical data 626 may then be used to select values for parameters 608 that result in desired level of heating 240 of composite patch 216.

In still other illustrative examples, analysis 618 may involve both finite element analysis 621 and empirical analysis 622. Both results 624 and empirical data 626 may be used to generate rework information 606. In particular, this information may be used to select values for parameters 608.

With this type of analysis, identification for each step in a curing process may be made. For example, different temperatures, intensities, and wavelengths may be used at different times during the curing process, depending on the particular implementation and the results of performing finite element analysis 621 on the composite patch.

Rework module 604 also may perform analysis 618 to identify rework information 606, taking into account whether temperature of the patch should be cycled between different temperatures. For example, analysis 618 may be used to identify heating and cooling cycles for the composite patch.

In this manner, rework module 604 may be configured to operate laser unit 224 to generate number of laser beams 236, resulting in desired level of heating 240 of composite patch 216 that cures composite patch 216 on composite structure 204 based on temperature data 244 for the patch by the sensor and using rework information 606.

Of course, analysis 618 may include any other types of suitable modeling or simulation processes in addition to and/or in place of finite element analysis 621 and/or empirical analysis 622.

This analysis may take into account factors, such as vacuum bag transparency, optical absorption of the resin material, the depth and number of plies in the layers of composite material removed to form the scarf, vacuum bag pressure, structural boundary conditions, and/or other suitable factors. As a result, different portions of area 620 for composite patch 216 may use different temperatures, different wavelengths, and different intensities, depending on the particular implementation.

Further, rework module 604 may be configured to perform analysis accuracy checks on parameters 608 used to perform heating of composite patch 216. In these illustrative examples, temperature data 244 may be used by controller 226 to see if parameters 608 provide desired level of heating 240 for curing composite patch 216.

For example, parameters 608 may have values that have been selected from performing finite element analysis 621 for curing composite patch 216. The different values for parameters 608 may be used to determine whether desired level of heating 240 occurs in actual use to cure composite patch 216. This analysis accuracy check may be performed by using a number of parameters 608 and receiving data 242 from sensor system 228.

With reference now to FIG. 7, an illustration of a block diagram of a mask system is depicted in accordance with an advantageous embodiment. In this illustrative example, mask system 230 is comprised of number of protective structures 700. Number of protective structures 700 is configured to cover number of components 246 in FIG. 2.

Number of protective structures 700 in mask system 230 may protect number of components 246 from exposure to number of laser beams 236. In other words, number of protective structures 700 may provide shielding or masking for these components.

Number of protective structures 700 may be placed in locations where heating for curing composite patch 216 in FIG. 2 is not needed. Number of protective structures 700 may comprise, for example, without limitation, reflective coating 702, plastic layer 704, metal layer 706, paint 708, and other suitable types of structures.

Thus, in these illustrative examples, number of protective structures 700 prevent the laser beam from heating areas in which number of components 246 is located.

The illustration of different components for rework system 220 in FIG. 2 in block form in FIGS. 3-7 are not meant to imply limitations to the manner in which different advantageous embodiments may be implemented. Other components may be used in addition to and/or in place of the ones illustrated in FIGS. 3-7. For example, a laser beam in number of laser beams 236 may be a different wavelength or wavelengths from other laser beams in number of laser beams 236. As another illustrative example, sensor system 228 in FIG. 5 may not always include camera system 502.

Figure 8:
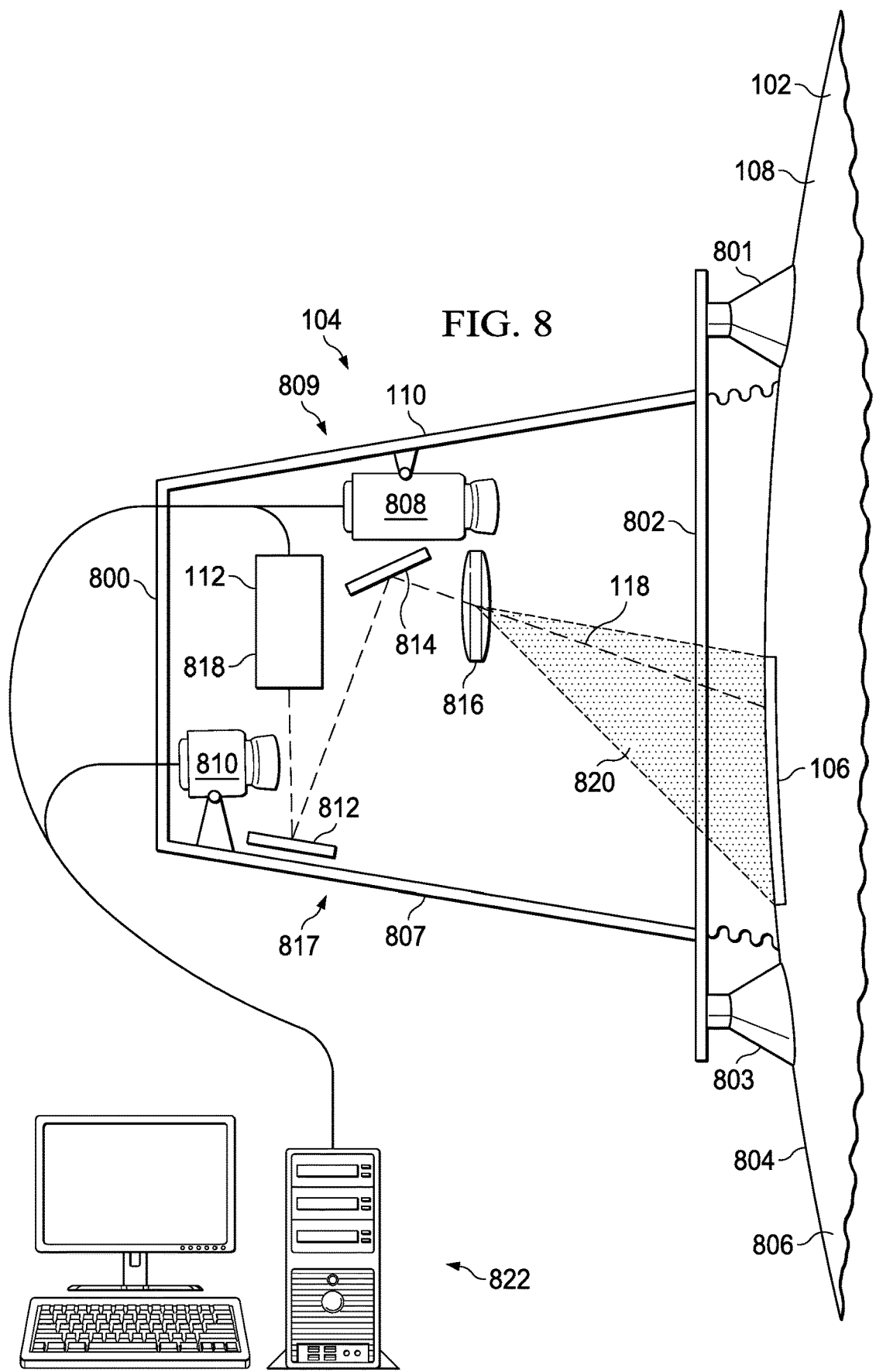
FIG. 8 is an illustration of a rework system in accordance with an advantageous embodiment.

With reference now to FIG. 8, an illustration of a rework system is depicted in accordance with an advantageous embodiment. In this illustrative example, a more-detailed depiction of rework system 104 in rework environment 100 is illustrated. In this illustrative example, frame 110 of rework system 104 has structure 800 and attachment system 802. Attachment system 802, in this illustrative example, comprises suction cups, such as suction cups 801 and 803, which are configured to attach frame 110 to surface 804 of composite structure 806 for aircraft 102.

Structure 800, in this illustrative example, is in the form of hood 807. Hood 807 is configured to reduce the chance that an operator may come into contact with laser beam 118 generated by laser unit 112 in this illustrative example. In other words, when structure 800 in frame 110 takes the form of hood 807, frame 110 reduces the exposure of an operator to laser beam 118.

In this illustrative example, sensor system 809 in rework system 104 comprises infrared camera 808 and visible camera 810.

Mirror 812, mirror 814, and scanning lens 816 are part of beam steering system 817 for laser source 818 in laser unit 112.

Scanning lens 816 is a lens that may change the direction of laser beam 118. In this illustrative example, scanning lens 816 may cause laser beam 118 to move in volume 820. Infrared camera 808, visible camera 810, laser source 818, and scanning lens 816 are controlled by controller 822.

Scanning lens 816 is a lens that may be controlled by a motor or actuator to direct laser beam 118 to move within volume 820 over composite patch 106. This movement also may be referred to as scanning. The type of scanning may be a raster type scanning.

Figure 9:
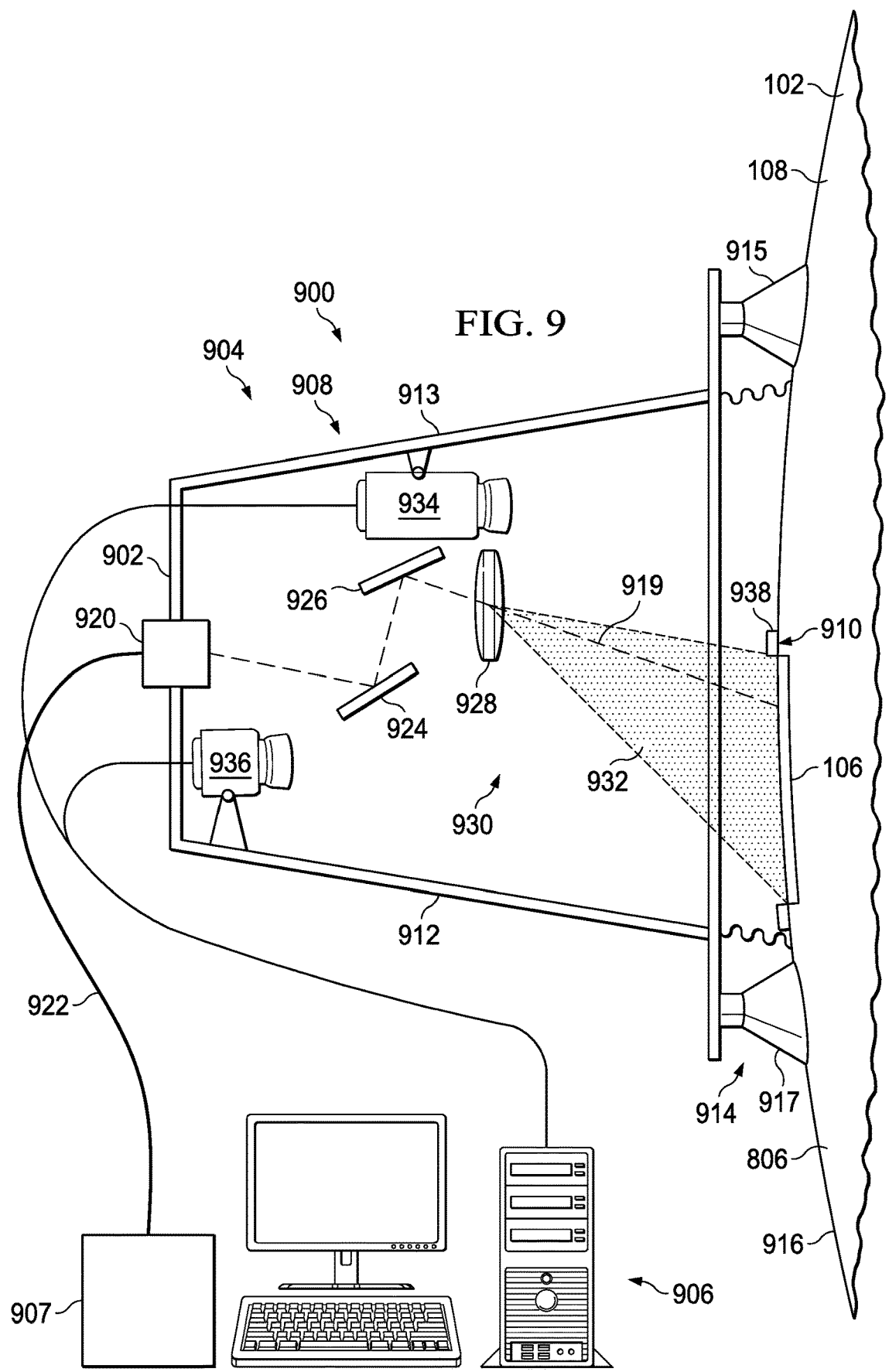
FIG. 9 is an illustration of a rework system in accordance with an advantageous embodiment.

With reference now to FIG. 9, an illustration of a rework system is depicted in accordance with an advantageous embodiment. In this illustrative example, rework system 900 is another example of a physical implementation for rework system 220 shown in block form in FIG. 2. Rework system 900 is an example of a rework system that may be used in place of rework system 104 to cure composite patch 106 at location 108 in FIG. 1.

As depicted, rework system 900 is attached to aircraft 102 at location 108. Rework system 900 is used to cure composite patch 106 in this illustrative example.

In this illustrative example, rework system 900 comprises frame 902, laser unit 904, controller 906, sensor system 908, and mask system 910.

Frame 902 comprises structure 912 and attachment system 914. Structure 912 takes the form of hood 913 in these illustrative examples. Attachment system 914 comprises suction cups, such as suction cups 915 and 917, which attach frame 902 to surface 916 of composite structure 806 of aircraft 102 in this illustrative example.

Laser unit 904 is associated with frame 902. In this illustrative example, only a portion of laser unit 904 is connected to frame 902. As depicted, laser source 907 is not supported by frame 902. Laser source 907 generates laser beam 919 and sends laser beam 919 to output 920 over fiber-optic cable 922. Output 920 is connected to frame 902 in these illustrative examples. In this manner, frame 902 may be configured to support less weight and may be itself lighter in weight and smaller when laser source 907 is not supported by frame 902.

In these illustrative examples, mirror 924, mirror 926, and scanning lens 928 form beam steering system 930 for laser unit 904. Laser beam 919 is steered using beam steering system 930 to move within volume 932 in this illustrative example.

As depicted, infrared camera 934 and physical camera 936 form sensor system 908 for rework system 900. These cameras generate images and/or other data that may be used to control laser unit 904 to cure composite patch 106 in a desired manner.

In this illustrative example, mask system 910 comprises protective structure 938, which is placed over portions of composite structure 806 in which heating is undesired. In this manner, if laser beam 919 strays from volume 932, other portions of composite structure 806 may remain unheated or heating may be reduced in a manner that does not change the performance of composite structure 806 in an undesired manner.

With reference now to FIG. 10, an illustration of a patch in a rework area with a mask system is depicted in accordance with an advantageous embodiment. In this illustrative example, protective structure 938 for mask system 910 is placed on surface 916 of composite structure 806.

Protective structure 938 is placed around edge 1000 of composite patch 106. Protective structure 938 has an area that is configured to reduce the effects of a laser beam that may stray from area 1002 in which composite patch 106 is located. In this manner, composite structure 806 may not become heated during curing of composite patch 106 if the laser beam moves out of area 1002. In these illustrative examples, protective structure 938 for mask system 910 is comprised of a reflective coating. This reflective coating is configured to reflect a laser beam that may be directed onto protective structure 938 outside of area 1002 for composite patch 106.

In this manner, undesired heating of composite structure 806 or other components under composite structure 806 may be avoided.

Turning to FIG. 11, an illustration of a cross-sectional view of a rework area is depicted in accordance with an advantageous embodiment. In this illustrative example, a cross-sectional view of composite structure 806 is seen as taken along lines 11-11 in FIG. 10.

Figure 12:
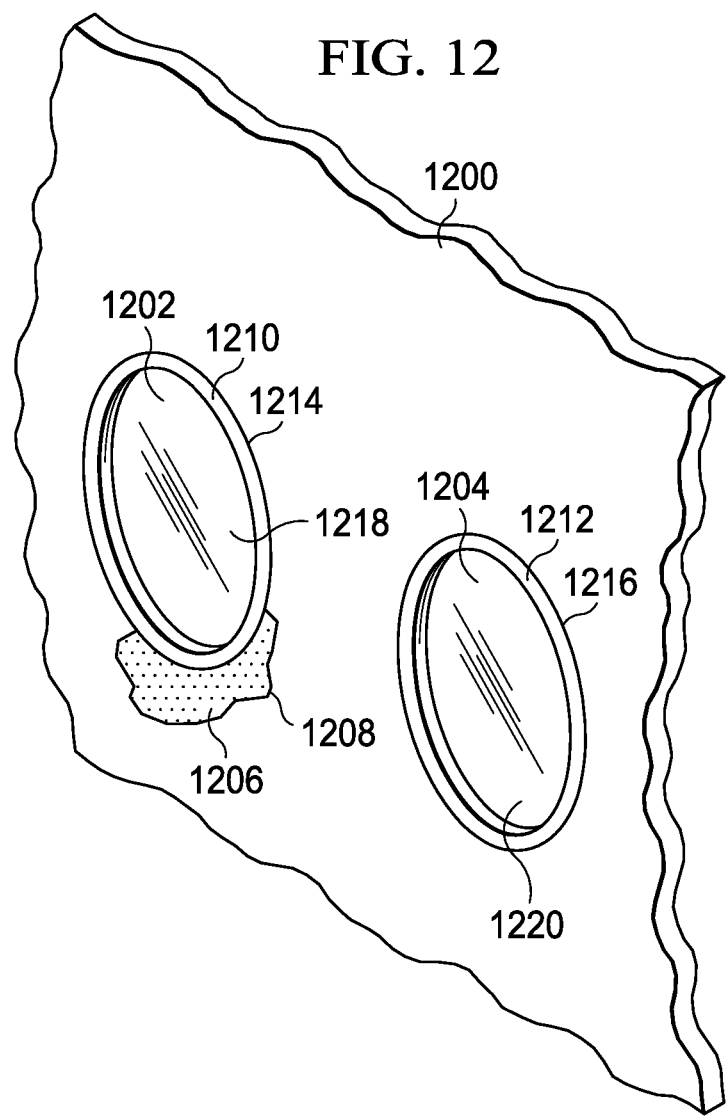
FIG. 12 is an illustration of an area in which a rework system may be used to cure a patch in accordance with an advantageous embodiment.

With reference now to FIG. 12, an illustration of an area in which a rework system may be used to cure a patch is depicted in accordance with an advantageous embodiment. In this illustrative example, an illustration of fuselage 1200 for an aircraft is depicted. As depicted, fuselage 1200 includes window 1202 and window 1204. Composite patch 1206 is located in area 1208.

In this illustrative example, window 1202 has frame 1210, and window 1204 has frame 1212. Frame 1210 may have coating 1214, and frame 1212 may have coating 1216. These coatings may be a protective and/or decorative coating. Further, window 1202 may have coating 1218, and window 1204 may have coating 1220.

In curing composite patch 1206, a laser beam heating any of coating 1214, coating 1216, coating 1218, and coating 1220 is undesirable. Heating of one or more of these coatings may result in an undesired change in the performance of these coatings and may require additional rework after curing of composite patch 1206.

With rework system 220 in FIG. 2, heating of composite patch 1206 in area 1208 without heating coating 1214, coating 1216, coating 1218, and/or coating 1220 may occur. As discussed above, rework system 220 may selectively direct a laser beam to only heat composite patch 1206 within area 1208. Further, the wavelength or wavelengths selected for the laser beam may be such that light from the laser beam is absorbed by the material in composite patch 1206 but is not absorbed by aluminum coating 1210. Further, the different advantageous embodiments also may cover one or more of coating 1214, coating 1216, coating 1218, and coating 1220 with a mask system as an additional tool for reducing heating of coating 1214, coating 1216, coating 1218, and coating 1220.

In this manner, one or more of the different advantageous embodiments may provide an ability to cure composite patch 1206 in a desired manner while reducing the effects of the curing process on other portions of fuselage 1200.

The illustration of rework system 104 in FIG. 1 and FIG. 8, and the illustration of rework system 900 in FIGS. 9-12 are examples of implementations of rework system 220 shown in block form in FIG. 2. These illustrations are not meant to imply limitations to the manner in which other rework systems may be physically implemented.

For example, other rework systems may generate more than one laser beam. In still other illustrative examples, other rework systems may have more than one laser unit or more than one laser source. In still other illustrative examples, other rework systems may not include both an infrared camera and a visible light camera. In still other illustrative examples, cameras may be omitted. Other types of sensors may be used or a sensor system may not be necessary, depending on the particular implementation.

Turning now to FIG. 13, an illustration of a flowchart of a process for curing a composite patch is depicted in accordance with an advantageous embodiment. The process illustrated in FIG. 13 may be implemented using rework system 220 in FIG. 2.

The process begins by attaching a rework system to a location with a composite patch (operation 1300). In this example, the rework system may comprise a laser unit and a controller. Of course, the rework system also may include other components, depending on the particular implementation.

The process then operates the rework system to generate a number of laser beams (operation 1302), with the process terminating thereafter. The number of laser beams is generated to result in a desired level of heating of a composite patch that cures the composite patch on the composite structure. In these illustrative examples, this desired level of heating is one that results in the composite patch having a desired level of performance once the composite patch is cured.

Figure 14:
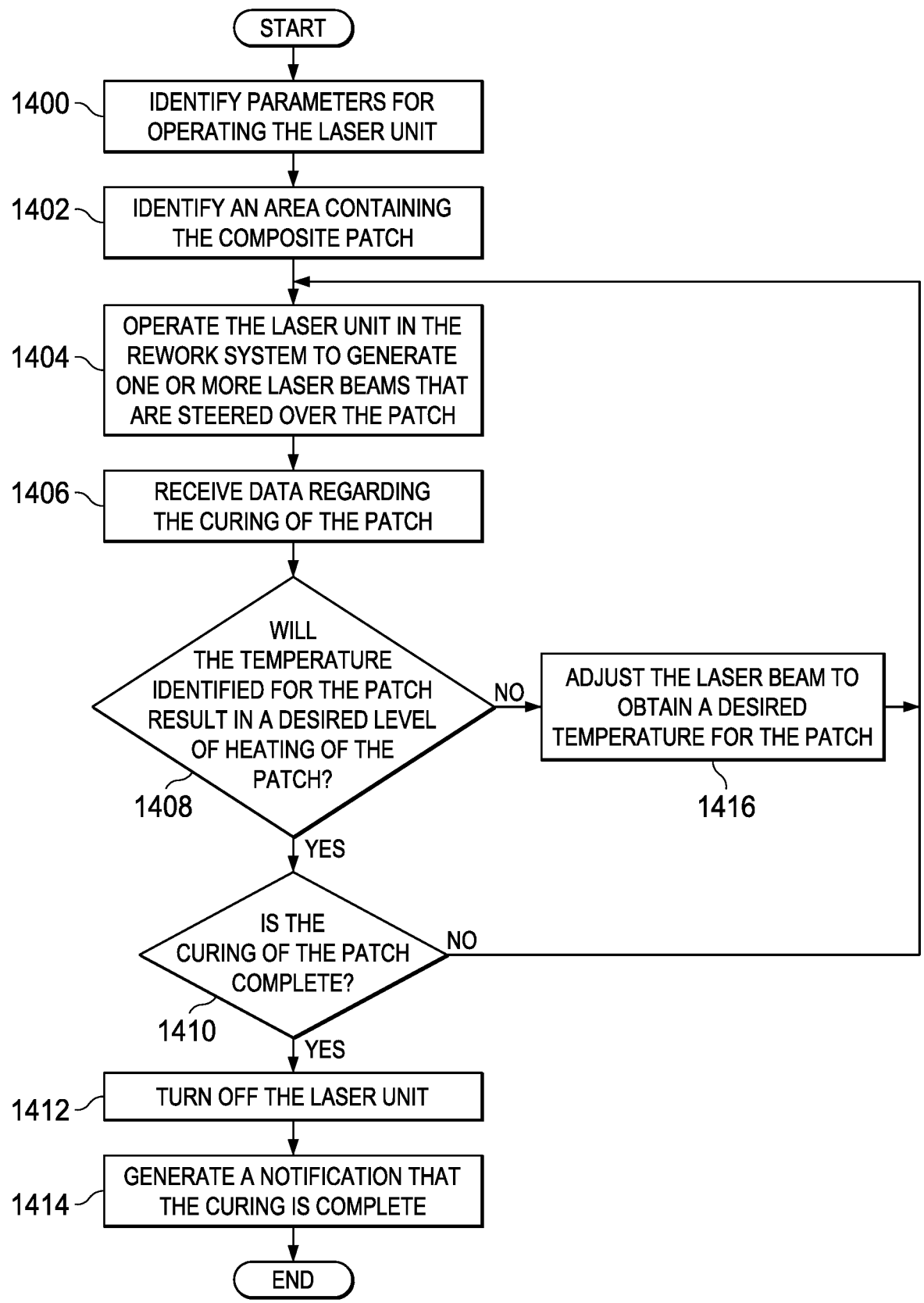
FIG. 14 is an illustration of a flowchart of a process for operating a rework system in accordance with an advantageous embodiment.

With reference now to FIG. 14, an illustration of a flowchart of a process for operating a rework system is depicted in accordance with an advantageous embodiment. The process illustrated in FIG. 14 is an example of operations that may be performed for operation 1302 in FIG. 13.

The process begins by identifying parameters for operating the laser unit (operation 1400). These parameters may be part of rework information 606 in FIG. 6. The parameters may include, for example, a wavelength for the laser beam, an intensity, and/or other suitable information for curing the composite patch in a desired manner.

The process then identifies an area containing the composite patch (operation 1402). This area may be identified using a sensor system in the rework system. This sensor system may be, for example, without limitation, a visible light camera, an infrared camera, or some other suitable type of sensor. The sensor system is used to identify the edges of where the rework should be performed. This sensor system may, for example, identify the area in which the patch is located.

The process then operates the laser unit in the rework system to generate one or more laser beams that are steered over the patch (operation 1404). This laser beam is generated and steered based on the parameters identified for curing the patch. The process receives data regarding the curing of the patch (operation 1406). This data includes temperature data that may be obtained as values from a sensor system or identified from images generated by the sensor system.

A determination is made as to whether the temperature identified for the patch will result in a desired level of heating of the patch (operation 1408). In this determination, the temperatures may be identified for different portions of a patch. Some portions of a patch may have a different desired temperature than other portions, depending on the configuration of the patch. In this illustrative example, a uniform temperature is desired to be present in the patch. This determination may be made in a number of different ways. For example, at least one of a finite element analysis, empirical data, or a look-up table may be used to determine whether the temperature identified for the patch will provide a desired level of heating.

If the temperature results in a desired level of heating of the patch, a determination is made as to whether the curing of the patch is complete (operation 1410). If the curing is complete, the process turns off the laser unit (operation 1412). A notification is generated that the curing is complete (operation 1414), and the process terminates thereafter.

With reference again to operation 1410, if the curing of the patch is not complete, the process returns to operation 1404 as discussed above.

With reference again to operation 1408, if the temperature does not result in a desired level of heating of the patch, the process adjusts the laser beam to obtain a desired temperature for the patch (operation 1416). The process then proceeds to operation 1404 as described above.

Figure 15:
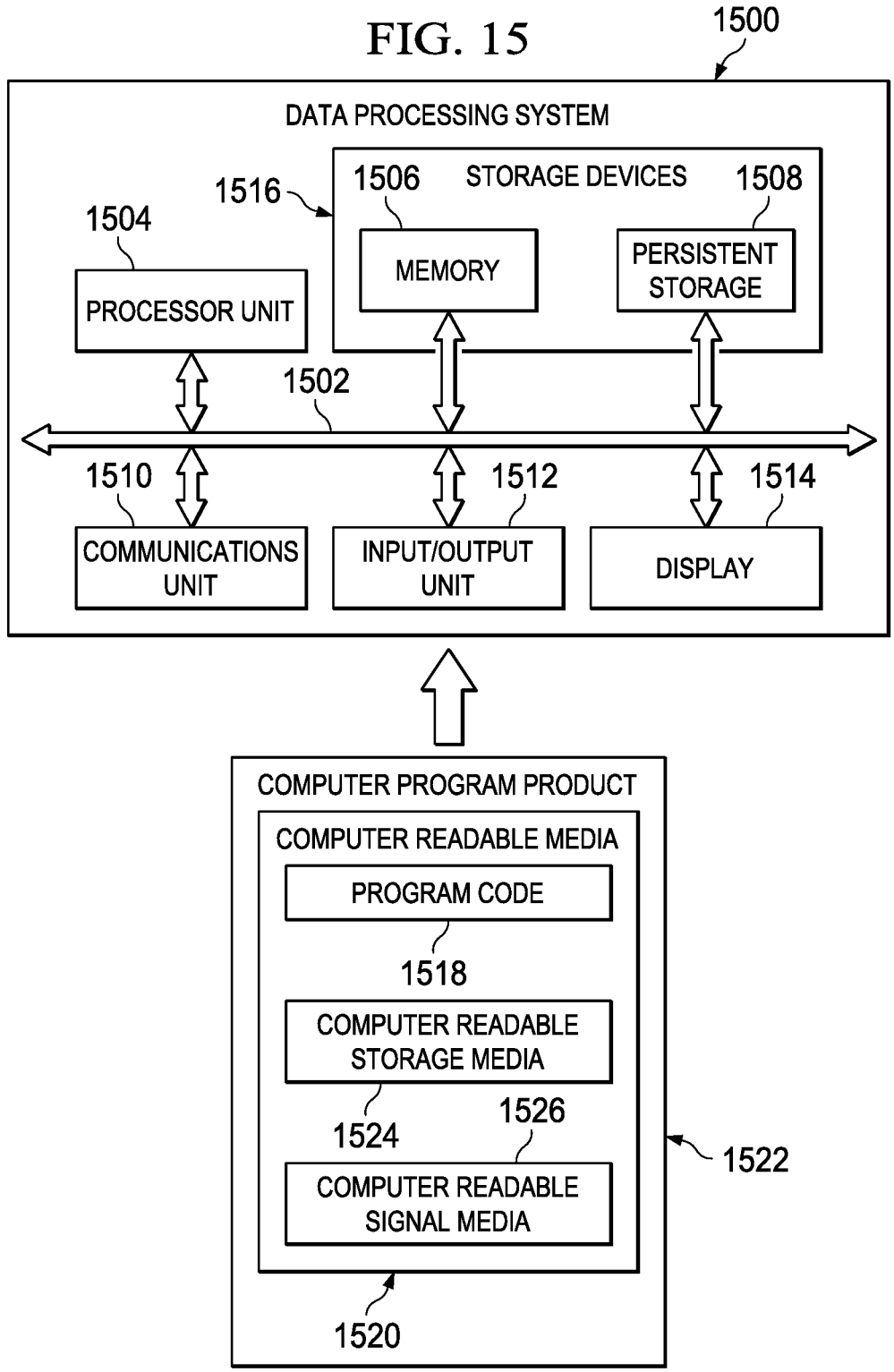
FIG. 15 is an illustration of a data processing system in accordance with an advantageous embodiment.

Turning now to FIG. 15, an illustration of a data processing system is depicted in accordance with an advantageous embodiment. Data processing system 1500 may be used to implement one or more computers in number of computers 602 in computer system 600 in FIG. 6. In this illustrative example, data processing system 1500 includes communications framework 1502, which provides communications between processor unit 1504, memory 1506, persistent storage 1508, communications unit 1510, input/output (I/O) unit 1512, and display 1514.

Processor unit 1504 serves to execute instructions for software that may be loaded into memory 1506. Processor unit 1504 may be a number of processors, a multi-processor core, or some other type of processor, depending on the particular implementation. A number, as used herein with reference to an item, means one or more items. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output unit 1512 allows for input and output of data with other devices that may be connected to data processing system 1500. For example, input/output unit 1512 may provide a connection for user input through a keyboard, a mouse, and/or some other suitable input device. Further, input/output unit 1512 may send output to a printer. Display 1514 provides a mechanism to display information to a user.

Instructions for the operating system, applications, and/or programs may be located in storage devices 1516, which are in communication with processor unit 1504 through communications framework 1502. In these illustrative examples, the instructions are in a functional form on persistent storage 1508. These instructions may be loaded into memory 1506 for execution by processor unit 1504. The processes of the different embodiments may be performed by processor unit 1504 using computer-implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526.

Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 also may take the form of a persistent storage, such as a hard drive, a thumb drive, or a flash memory, that is connected to data processing system 1500. In some instances, computer readable storage media 1524 may not be removable from data processing system 1500.

In these examples, computer readable storage media 1524 is a physical or tangible storage device used to store program code 1518 rather than a medium that propagates or transmits program code 1518. Computer readable storage media 1524 is also referred to as a computer readable tangible storage device or a computer readable physical storage device. In other words, computer readable storage media 1524 is a media that can be touched by a person.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different advantageous embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1518 may be omitted, because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

In another example, a bus system may be used to implement communications framework 1502 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1506, or a cache, such as found in an interface and memory controller hub that may be present in communications framework 1502.

Figure 16:
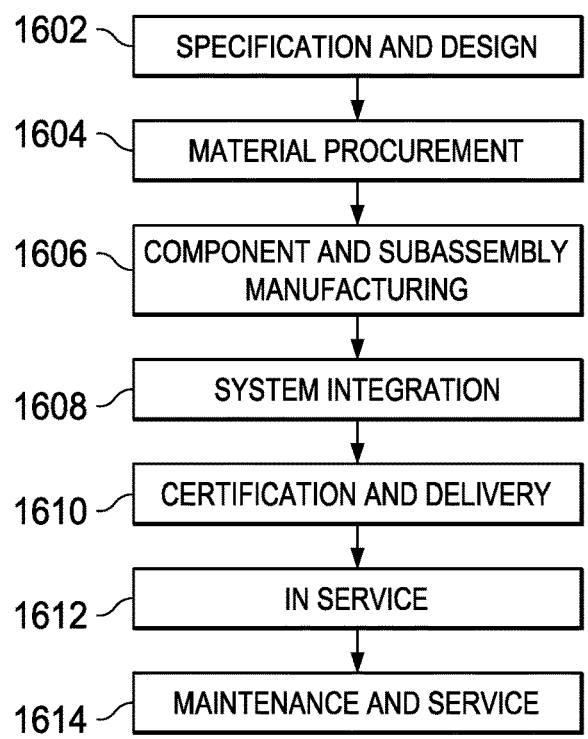
FIG. 16 is an illustration of an aircraft manufacturing and service method in accordance with an advantageous embodiment.
Figure 17:
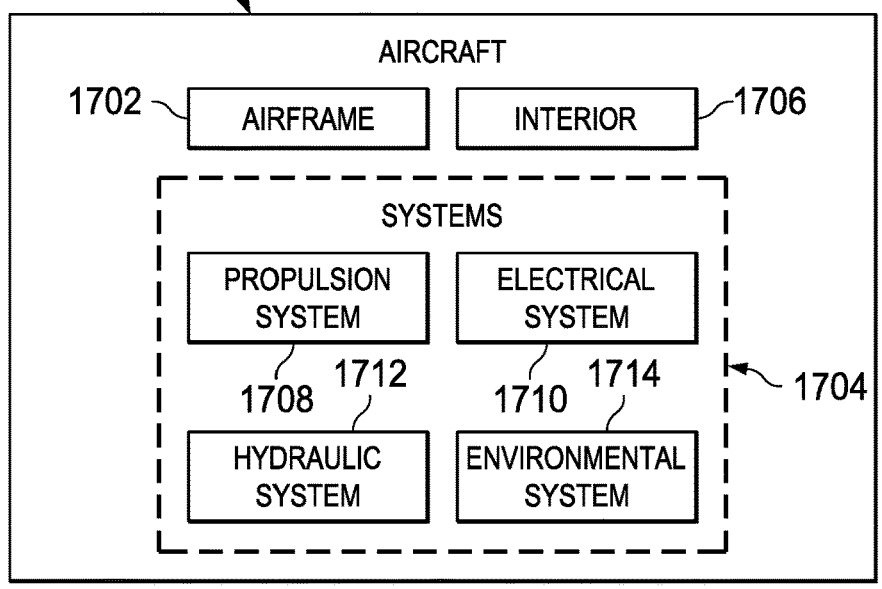
FIG. 17 is an illustration of an aircraft in which an advantageous embodiment may be implemented.

Advantageous embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an advantageous embodiment. During preproduction, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an advantageous embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 1600 in FIG. 16.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612 and/or during maintenance and service 1614 in FIG. 16. The use of a number of the different advantageous embodiments may substantially expedite the assembly of and/or reduce the cost of aircraft 1700.

In particular, one or more advantageous embodiments may be used to perform rework on different components of aircraft 1700 during one or more different phases of aircraft manufacturing and service method 1600. In particular, rework system 220 in FIG. 2 may be used to perform rework on aircraft 1700 during component and subassembly manufacturing 1606, maintenance and service 1614, and other phases of aircraft manufacturing and service method 1600.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for curing a composite patch on a composite structure, the method comprising:
attaching a rework system comprising a sensor system and a laser unit to a location on the composite structure comprising the composite patch;
receiving, in a controller configured to operate the laser unit, rework information for generating commands for selecting and transmitting, from the laser unit during curing the composite patch on the composite structure, a wavelength and intensity required to pass through a vacuum bag with a vacuum applied to the vacuum bag and cause a desired level of resin flow in the composite patch within the vacuum bag, such that the rework information comprises the following:
a model of the composite patch;
an optical absorption factor of a resin, respectively, in each of a number of portions in the composite patch;
a pressure within the vacuum bag; and
a heating cycle for each portion in the number of portions in the composite patch;
curing the composite patch on the composite structure via operating the rework system using a simulation comprising at least one of: a finite analysis and an analytical analysis of the rework information for controlling the laser unit and directing a number of laser beams through the vacuum bag with the vacuum applied to the vacuum bag resulting in the desired level of resin flow in each of the number of portions the composite patch; and
using the sensor system, identifying the following:
an area for directing within the number of laser beams from the laser unit;
tracking of each of the number of laser beams;
an amount of curing in each of the number of portions in the composite patch; and
laser beam adjustments during curing for achieving the desired level of resin flow for curing.

2. The method of claim 1, further comprising:
identifying parameters for operating the rework system-using the model of the composite patch the rework system analyzing, using sensed heating of the composite patch, an accuracy of the rework information for curing that cures the composite patch on the composite structure.

3. The method of claim 2, further comprising:
monitoring, using a camera, heating of the composite patch the rework system using the parameters identified to generate the number of laser beams resulting in the desired level of resin flow in the composite patch that cures the composite patch on the composite structure; and
adjusting the parameters when the desired level of resin flow in the composite patch is absent.

4. The method of claim 1, further comprising:
placing a mask system in the location, wherein the mask system is configured to reduce heating of a component covered by the mask system if a laser beam passes over the mask system.

5. The method of claim 1, further comprising:
placing the composite patch in the location prior to attaching the rework system to the location.

6. The method of claim 1, further comprising the rework system comprising:
the controller identifying movements, for the number of laser beams over a surface of the composite patch, using a beam steering system, in a manner causing the desired level of resin flow in the composite patch; and
the beam steering system comprising at least one: of mirrors, fiber-optic cables, or lenses, and the movements based upon a simulation analysis accounting for a transparency of the vacuum bag covering the composite patch.

7. The method of claim 1, further comprising a laser beam, in the number of laser beams, comprising a wavelength between 300 and 1300 nanometers as commanded by the controller causing the desired level of resin flow in the composite patch for each step needed to cure the composite patch on a surface of the composite structure.

8. The method of claim 1, further comprising the rework system comprising a module specially programmed for selecting the wavelength for increasing an absorption of light, in the number of laser beams, by the composite patch while avoiding increased light absorption by materials adjacent to the area for laser illumination.

9. The method of claim 1, further comprising:
the rework system comprising: a frame, an attachment system for attaching the frame to a surface of the composite surface; and
directing the number of laser beams to a first mirror, a second mirror, and a scanning lens, mounted within the frame.

10. The method of claim 9, further comprising the laser unit comprising a laser source within the laser unit.

11. The method of claim 9, further comprising:
attaching a camera system to the frame;
connecting the camera system to the controller;
generating, using the camera system, information about the composite patch; and
identifying, via the camera system, the area that a laser beam is to be directed using the information about the composite patch.

12. The method of claim 9, further comprising:
detecting, via the sensor system, heating of the composite patch on the composite structure;
generating, using the sensor system, temperature data for the composite patch; and
causing the desired level of resin flow in the composite patch and curing the composite patch on the surface of the composite structure via using the temperature data.

13. The method of claim 12, further comprising the temperature data comprising one of images or temperature values.

14. A process for reworking a composite patch comprising layers comprising a fabric and a resin in an uncured form, the process comprising:
attaching a frame over the composite patch on a structure comprising the composite patch;
generating a laser beam from a laser unit and laser source attached to the frame;
covering the composite patch with a vacuum bag comprising a transparency, with a vacuum applied to the vacuum bag, for the laser beam;
receiving, in a controller, the following:
via a sensor system comprising a visible camera and an infrared camera each attached to the frame and connected to a rework module in the controller, temperature data about the composite patch; and
rework information and data, for each portion of a number of portions of the composite patch, comprising:

a model of the composite patch;
a depth and a number of plies in layers of a composite material removed to form a scarf being filled, by the composite patch, in a composite structure;
boundary conditions of the scarf;
an optical absorption factor of the resin in the composite patch;
the transparency of the vacuum bag;
a pressure within the vacuum bag; and
a heating cycle and a cooling cycle for each portion of the number of portions of the composite patch;
generating and transmitting via controller commands, with the vacuum applied to the vacuum bag, the laser beam through the vacuum bag;
curing the composite patch via heating each portion of the number of portions of the composite patch to a desired level as needed at each step in a curing process;
the controller using the sensor system, the model of the composite patch, and a simulation for identifying the following:
a wavelength and an intensity for the laser beam causing the desired level of heating each portion of the number of portions of the composite patch;
an area for directing within the laser beam;
tracking of the laser beam;
an amount of curing in each of the number of portions in the composite patch; and
an accuracy of the rework information and data for curing the composite patch.

15. The process of claim 14, further comprising:
the structure comprising a composite material adjacent to the composite patch;
the controller using the sensor system and the model of the composite patch for identifying laser beam adjustments during curing for achieving the desired level of heating for curing.

16. The process of claim 14, further comprising:
the laser beam comprising a first laser beam;
the laser unit generating a second laser beam; and
the controller controlling the laser unit and generating the first laser beam and the second laser beam and causing the desired level of heating of the composite patch to cure the composite patch inside the vacuum bag.

17. The process of claim 14, further comprising the desired level of heating comprising one or more of: a particular temperature, a range of temperatures, and an amount of resin flow.

18. The process of claim 14, further comprising the composite patch being located in the scarf in a surface of the composite structure, the scarf resulting from a removal of layers of composite material from the area of the composite structure.

19. The process of claim 14, further comprising the controller conducting an analysis using at least one of: a simulation process, a finite analysis, and an empirical analysis, based upon at least one factor from a group of factors that comprises: the transparency of the vacuum bag that covers the composite patch, an optical absorption of a resin material in the composite patch, the depth and a number of plies layers of composite material removed to form the scarf receiving the composite patch, and the pressure in the vacuum bag.

20. A method for reworking a composite patch, comprising a layer of fabric in an uncured resin, on a composite surface of an aircraft, the method comprising;
generating a scarf section in the composite surface of the aircraft;
covering the composite patch with a vacuum bag and a frame comprising a laser unit and a sensor unit;
programming a controller for receiving information regarding:
the scarf section in the composite surface of the aircraft receiving the composite patch;
a composition of material within the composite patch; and
a pressure within and transparency characteristics of the vacuum bag covering the composite patch;
formulating in the controller, using a model of the composite patch and at least one of; the transparency characteristics of the vacuum bag that covers the composite patch, an optical absorption of a resin material in the composite patch, a depth and a number of plies layers of composite material removed to form a scarf receiving the composite patch, and the pressure in the vacuum bag, a heating control selecting a wavelength, intensity, path, and irradiation time for a number of laser beams in the laser unit, such that each portion of a number of portions of the composite patch reaches a desired level of heating during each step of a curing process while avoiding overheating the layer of fabric in the composite patch;
detecting, via a sensor system comprising a visible camera and an infrared camera each attached to the frame, heating of each portion of the composite patch within the vacuum bag;
generating, using the sensor system, temperature data for the composite patch;
receiving, in the controller, the temperature data;
curing the composite patch via controlling the number of laser beams in the laser unit resulting in the desired level of heating for each portion in the number of portions of the composite patch in the composite surface; and
sensing an amount of curing of each portion in the number of portions of the composite patch and using the amount of curing for confirming a compliance of the laser unit with the heating control or adjusting the heating control.

* * * * *